(12) United States Patent
Wu et al.

(10) Patent No.: US 11,496,262 B2
(45) Date of Patent: *Nov. 8, 2022

(54) REFERENCE SIGNAL TRANSMISSION METHOD AND APPARATUS

(71) Applicant: HUAWEI TECHNOLOGIES CO., LTD., Guangdong (CN)

(72) Inventors: Dan Wu, Shenzhen (CN); Lei Chen, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/403,422

(22) Filed: Aug. 16, 2021

(65) Prior Publication Data

US 2022/0038236 A1 Feb. 3, 2022

Related U.S. Application Data

(63) Continuation of application No. 16/746,543, filed on Jan. 17, 2020, now Pat. No. 11,108,520, which is a
(Continued)

(30) Foreign Application Priority Data

Aug. 1, 2017 (CN) .......................... 201710648853.X

(51) Int. Cl.
*H04L 5/00* (2006.01)
*H04L 27/26* (2006.01)
(52) U.S. Cl.
CPC ........ *H04L 5/0048* (2013.01); *H04L 27/2613* (2013.01); *H04L 27/2688* (2013.01); *H04L 27/26132* (2021.01)

(58) Field of Classification Search
CPC ............... H04L 5/0048; H04L 27/2613; H04L 27/2688
(Continued)

(56) References Cited

U.S. PATENT DOCUMENTS 11,108,520 B2 * 8/2021 Wu .................. H04L 25/03
2012/0314743 A1 12/2012 Yoon
(Continued)

FOREIGN PATENT DOCUMENTS

CN 1404234 A 3/2003
CN 101361337 A 2/2009
(Continued)

OTHER PUBLICATIONS

Huawei et al: "PTRS for DFT-s-OFDM",3GPP Draft; R1-1708142,May 6, 2017 (May 6, 2017), XP051262277,total 4 pages.
(Continued)

*Primary Examiner* — Emmanuel Bayard
(74) *Attorney, Agent, or Firm* — Womble Bond Dickinson (US) LLP

(57) ABSTRACT

This application discloses a reference signal transmission method and apparatus. The method includes: generating one or more OFDM symbols, where at least one OFDM symbol includes a PTRS resource block, the PTRS resource block includes at least two of three sequences: a PTRS sequence of Y elements, X elements after the PTRS sequence, and Z elements before the PTRS sequence, and the PTRS resource block occupies a plurality of consecutive resource elements REs, where X, Y, and Z are all integers; and sending the one or more OFDM symbols. According to the foregoing method and apparatus, inter-carrier interference is reduced, thereby improving spectral efficiency.

16 Claims, 3 Drawing Sheets

Related U.S. Application Data continuation of application No. PCT/CN2018/095218, filed on Jul. 11, 2018.

(58) Field of Classification Search
USPC .................................................. 375/260, 329
See application file for complete search history.

(56) References Cited

U.S. PATENT DOCUMENTS

| | | |
|---|---|---|
| 2014/0314000 A1 | 10/2014 | Jialing et al. |
| 2018/0091350 A1 | 3/2018 | Akkarakaran |
| 2018/0205528 A1 | 7/2018 | Bai |
| 2018/0331807 A1 | 11/2018 | Kim |
| 2018/0351719 A1* | 12/2018 | Lee ................. H04L 5/0053 |
| 2020/0008228 A1* | 1/2020 | Lee ................. H04L 27/261 |
| 2020/0052740 A1 | 2/2020 | Zhang |
| 2020/0077419 A1 | 3/2020 | Lee |
| 2020/0287751 A1 | 9/2020 | Lee |
| 2020/0304259 A1 | 9/2020 | Ihalainen |
| 2020/0389270 A1 | 12/2020 | Lee |

FOREIGN PATENT DOCUMENTS

| | | |
|---|---|---|
| CN | 102160322 A | 8/2011 |
| CN | 104066147 A | 9/2014 |

OTHER PUBLICATIONS

Nokia et al., "On Details of the PT-RS Design for DFT-s-OFDM",3GPP TSG RAN WG1 NR Ad-Hoc#2 R1-1711631, Qingdao, P.R. China, Jun. 27-30, 2017,total 6 pages.

ZTE: "Discussion on RS for phase tracking",3GPP Draft; R1-1707132,May 7, 2017 (May 7, 2017), XP051262920,total 12 pages.

Qualcomm Incorporated, "Phase and frequency tracking reference signal considerations",3GPP TSG-RAN WG1 #88 R1-1702617,Feb. 13-17, 2017,total 7 pages.

Mitsubishi Electric: "UL PTRS for DFTsOFDM waveform",3GPP Draft; R1-1710230,Jun. 16, 2017 (Jun. 16, 2017), XP051304262,total 10 pages.

\* cited by examiner

Cyclic PTRS

Cyclic PTRS

FIG. 3c
FIG. 3d
Repeated PTRS
FIG. 4a
FIG. 4b
FIG. 5
FIG. 6

REFERENCE SIGNAL TRANSMISSION METHOD AND APPARATUS

CROSS-REFERENCE TO RELATED APPLICATIONS

This application is a continuation of U.S. patent application Ser. No. 16/746,543, filed on Jan. 17, 2020, which is a continuation of International Application No. PCT/CN2018/095218, filed on Jul. 11, 2018 which claims priority to Chinese Patent Application No. 201710648853.X, filed on Aug. 1, 2017. All of the afore-mentioned patent applications are hereby incorporated by reference in their entireties.

TECHNICAL FIELD

This application relates to the field of communications technologies, and in particular, to a reference signal transmission method and apparatus.

BACKGROUND

With development of network systems, requirements on a communication rate and a capacity increase, and therefore a requirement on high-frequency resources also increases. A next-generation wireless communications network whose operating frequency band is above 6 GHz, for example, the 5th generation (5G) network, can provide an ultrahigh-speed data communication service. Within a frequency range above 6 GHz, frequency bands that can be used for the next-generation wireless communications network include frequency bands at 28 GHz, 39 GHz, 60 GHz, 73 GHz, and the like. A high-frequency communications system whose operating frequency band is above 6 GHz has significant features such as high bandwidth and a highly-integrated antenna array. Therefore, a relatively high throughput is easily implemented. However, an increase in a frequency results in an increase in phase noise (PHN) generated by random jitter of a frequency component, namely, a local oscillator. Therefore, impact of phase noise in high-frequency wireless communication cannot be ignored. As a frequency band increases, a higher phase noise level indicates greater impact on a received signal. Usually, a transmit end device may add a phase tracking reference signal (PTRS), and a receive end may estimate the phase noise based on the received PTRS.

A higher frequency band supported by a radio frequency component indicates greater impact of the phase noise. In the 5G standard, a carrier frequency band supported by a new radio (NR) network may be greater than 60 GHz, and impact of phase noise cannot be ignored in some cases. The PTRS has been allowed to be introduced in NR to measure and compensate for the phase noise.

Compared with an existing wireless communications network, the high-frequency communications system suffers more serious intermediate radio frequency distortion, especially impact caused by phase noise. In addition, impact of the Doppler effect and carrier frequency offset (CFO) on performance of the high-frequency communications system also increases as a position of a frequency band becomes higher. A common feature of the phase noise, the Doppler effect, and the CFO is that, a phase error, or referred to as phase offset, is brought to data reception of the high-frequency communications system. Consequently, the high-frequency communications system is deteriorated in performance, or even cannot operate.

In addition, in the next-generation wireless communications network, to meet an increasing communication requirement, an increasingly high requirement is imposed on higher order modulation such as 256 QAM (Quadrature Amplitude Modulation) or even 1024 QAM. In this case, in addition to a common phase error (CPE), inter-carrier interference (ICI) caused by the phase offset cannot be ignored either.

In the prior art, during PTRS configuration, impact of inter-carrier interference caused by phase offset, on performance of a high-frequency communications system is almost not considered. Especially, when a modulation order is relatively high, the inter-carrier interference of the high-frequency communications system cannot be accurately estimated, and a bit error rate is high, resulting in relatively low spectral efficiency.

SUMMARY

This application provides a reference signal transmission method and apparatus, to reduce inter-carrier interference, thereby improving spectral efficiency.

An aspect of this application provides a reference signal transmission method, including:

generating one or more orthogonal frequency division multiplexing (OFDM) symbols, where at least one OFDM symbol includes a phase tracking reference signal (PTRS) resource block, the PTRS resource block includes at least two of three sequences: a PTRS sequence of Y elements, X elements after the PTRS sequence, and Z elements before the PTRS sequence, and the PTRS resource block occupies a plurality of consecutive resource elements (REs), where X, Y, and Z are all integers; and sending the one or more OFDM symbols.

Corresponding to the foregoing transmission solution at a transmit end, a transmission solution at a receive end is further disclosed. The transmission solution includes:

receiving one or more orthogonal frequency division multiplexing (OFDM) symbols, where at least one OFDM symbol includes a phase tracking reference signal (PTRS) resource block, the PTRS resource block includes at least two of three sequences: a PTRS sequence of Y elements, X elements after the PTRS sequence, and Z elements before the PTRS sequence, and the PTRS resource block occupies a plurality of consecutive resource elements (REs), where X, Y, and Z are all integers; and obtaining a complete PTRS sequence from the one or more OFDM symbols.

Corresponding to the foregoing method, a corresponding apparatus is further disclosed. A transmit end includes:

a processing module, configured to generate one or more orthogonal frequency division multiplexing (OFDM) symbols, where at least one OFDM symbol includes a phase tracking reference signal (PTRS) resource block, the PTRS resource block includes at least two of three sequences: a PTRS sequence of Y elements, X elements after the PTRS sequence, and Z elements before the PTRS sequence, and the PTRS resource block occupies a plurality of consecutive resource elements (REs), where X, Y, and Z are all integers; and a sending module, configured to send the one or more OFDM symbols.

A receive end includes:

a receiving module, configured to receive one or more orthogonal frequency division multiplexing (OFDM) symbols, where at least one OFDM symbol includes a phase tracking reference signal (PTRS) resource block, the PTRS resource block includes at least two of three sequences: a PTRS sequence of Y elements, X elements after the PTRS sequence, and Z elements before the PTRS sequence, and the PTRS resource block occupies a plurality of consecutive resource elements (REs), where X, Y, and Z are all integers; and a processing module, configured to obtain a complete PTRS sequence from the one or more OFDM symbols.

In the foregoing solution, each OFDM symbol may include the PTRS resource block, and there may be one or more PTRS resource blocks in one OFDM symbol. In this case, the foregoing solution may be:

generating one or more orthogonal frequency division multiplexing (OFDM) symbols, where each OFDM symbol includes at least one phase tracking reference signal (PTRS) resource block, each PTRS resource block includes at least two of three sequences: a PTRS sequence of Y elements, X elements after the PTRS sequence, and Z elements before the PTRS sequence, and the PTRS resource block occupies a plurality of consecutive resource elements (REs), where X, Y, and Z are all integers; and sending the one or more OFDM symbols.

Corresponding to the foregoing transmission solution at the transmit end, a transmission solution at the receive end is further disclosed. The transmission solution includes:

receiving one or more orthogonal frequency division multiplexing (OFDM) symbols, where each OFDM symbol includes at least one phase tracking reference signal (PTRS) resource block, each PTRS resource block includes at least two of three sequences: a PTRS sequence of Y elements, X elements after the PTRS sequence, and Z elements before the PTRS sequence, and the PTRS resource block occupies a plurality of consecutive resource elements (REs), where X, Y, and Z are all integers; and obtaining a complete PTRS sequence from the one or more OFDM symbols.

Corresponding to the foregoing method, a corresponding apparatus is further disclosed. A transmit end includes:

a processing module configured to generate one or more orthogonal frequency division multiplexing (OFDM) symbols, where each OFDM symbol includes at least one phase tracking reference signal (PTRS) resource block, each PTRS resource block includes at least two of three sequences: a PTRS sequence of Y elements, X elements after the PTRS sequence, and Z elements before the PTRS sequence, and the PTRS resource block occupies a plurality of consecutive resource elements (REs), where X, Y, and Z are all integers; and a sending module, configured to send the one or more OFDM symbols.

A receive end includes:

a receiving module, configured to receive one or more orthogonal frequency division multiplexing (OFDM) symbols, where each OFDM symbol includes at least one phase tracking reference signal (PTRS) resource block, each PTRS resource block includes at least two of three sequences: a PTRS sequence of Y elements, X elements after the PTRS sequence, and Z elements before the PTRS sequence, and the PTRS resource block occupies a plurality of consecutive resource elements (REs), where X, Y, and Z are all integers; and a processing module, configured to obtain a complete PTRS sequence from the one or more OFDM symbols.

In the foregoing solutions, if the transmit end is a network device, the receive end is a terminal device. Alternatively, if the transmit end is a terminal device, the receive end is a network device.

The foregoing apparatuses at the transmit end and the receive end may alternatively be in another form. The processing module is implemented by a processor, the receiving module is implemented by a receiver, and the sending module is implemented by a transmitter.

With reference to the foregoing method solutions and apparatus solutions, the PTRS resource block is located in one or more resource blocks (RBs).

With reference to the foregoing method solutions and apparatus solutions, the PTRS resource block includes X+Y+Z elements, and the X elements, the Y elements, and the Z elements are consecutive and arranged in a frequency division manner, where X≤Y and Z≤Y; or the PTRS resource block includes X+Y elements or Y+Z elements, and the X elements and the Y elements, or the Y elements and the Z elements are consecutive and arranged in a frequency division manner, where X≤Y and Z≤Y; or the PTRS resource block includes X+Z elements, and the X elements and the Z elements are consecutive and arranged in a frequency division manner, where (X+Z)≥Y, for example, (X+Z)≥(Y+2).

When the PTRS resource block includes X+Y elements or Y+Z elements, and X=Y or Y=Z, it is equivalent that the PTRS resource block includes two consecutive and same PTRS sequences.

With reference to the foregoing method solutions and apparatus solutions, when at least two OFDM symbols each include the PTRS resource block, or there are a plurality of OFDM symbols that include the PTRS resource block, the PTRS resource block may occupy a same position or different positions in the OFDM symbols, and the position herein is a frequency domain resource position in each OFDM symbol.

According to the foregoing methods and corresponding apparatuses, inter-carrier interference is reduced, thereby improving spectral efficiency.

Another aspect of this application provides a computer-readable storage medium. The computer-readable storage medium stores an instruction, and when the instruction is run on a computer, the computer is enabled to perform the methods according to the foregoing aspects.

Still another aspect of this application provides a communications chip, where the communications chip stores an instruction, and when the instruction is run on a network device or a terminal device, the network device or the terminal device is enabled to perform the methods according to the foregoing aspects.

Still another aspect of this application provides a computer program product including an instruction. When the computer program product is run on a computer, the computer is enabled to perform the methods according to the foregoing aspects.

BRIEF DESCRIPTION OF DRAWINGS

FIG. 3c is a schematic structural diagram of still another PTRS resource block according to an embodiment of this application;

FIG. 3d is a schematic structural diagram of still another PTRS resource block according to an embodiment of this application;

FIG. 4a is a schematic structural diagram of still another PTRS resource block according to an embodiment of this application;

FIG. 4b is a schematic structural diagram of still another PTRS resource block according to an embodiment of this application;

FIG. 5 is a schematic diagram of an OFDM symbol including a PTRS resource block according to an embodiment of this application;

FIG. 6 is a schematic diagram of an OFDM symbol including a PTRS resource block according to another embodiment of this application;

DESCRIPTION OF EMBODIMENTS

The following describes the embodiments of this application with reference to the accompanying drawings in the embodiments of this application.

The term "a plurality of" in this application means two or more. The term "and/or" in this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. In this application, the terms "first", "second", and the like are intended to distinguish between different objects but do not limit a sequence of the different objects.

The technical solutions provided in this application may be applied to various communications systems in which a beam sweeping technology is used, for example, an existing communications system in which the beam sweeping technology is used, a 5G communications system, a future evolved system, or a plurality of converged communications systems. A plurality of application scenarios may be included, for example, a machine-to-machine (M2M) scenario, a device-to-device (D2D) scenario, a macro-micro communication scenario, an enhanced mobile broadband (eMBB) scenario, an ultra-reliable and low latency communications (uRLLC) scenario, and a massive machine-type communications (mMTC) scenario. These scenarios may include but are not limited to a scenario of communication between terminals, a scenario of communication between network devices, a scenario of communication between a network device and a terminal, and the like. The technical solutions provided in this application may also be applied to a scenario of communication between terminals, a scenario of communication between network devices, or the like in a 5G communications system.

Figure 1:
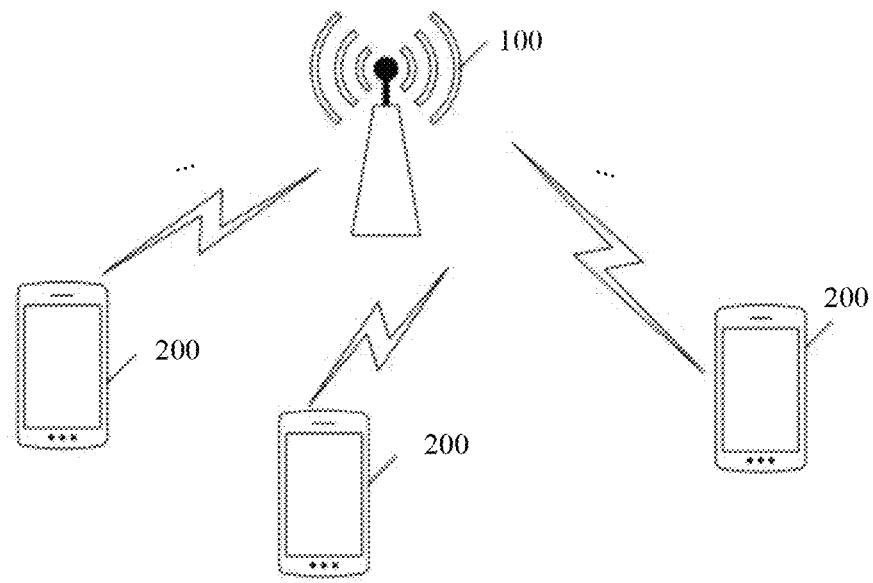
FIG. 1 is a schematic architectural diagram of a communications system.

FIG. 1 is a schematic diagram of a communications system to which the technical solutions provided in this application are applicable. The communications system may include one or more network devices 100 (only one network device is shown) and one or more terminal devices 200 connected to the network devices 100.

The network device 100 may be a device that can communicate with the terminal device 200. The network device 100 may be a base station (for example, a base transceiver station (BTS), a NodeB (NB), an evolved NodeB (eNB or eNodeB), a transmission reception point (TRP or TP) or a next generation NodeB (gNB) in an NR system, or a base station or network device in a future communications network), a relay station, an access point, a vehicle-mounted device, a wearable device, a wireless-fidelity (Wi-Fi) station, a wireless backhaul node, a small cell, a micro base station, or the like. The network device 100 may alternatively be a radio controller in a cloud radio access network (CRAN) scenario. Alternatively, the network device 100 may be a network device in a 5G communications system or a network device in a future evolved network, or may be a wearable device, a vehicle-mounted device, or the like.

The terminal device 200 may be, for example, user equipment (UE), an access terminal, a subscriber unit, a subscriber station, a mobile station, a mobile terminal, a remote station, a remote terminal, a mobile device, a user terminal, a terminal, a wireless communications device, a user agent, a user apparatus, a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal in a future 5G network, or a terminal in a future evolved PLMN.

For an orthogonal frequency division multiplexing (OFDM) system, when fast Fourier transformation (FFT) is performed on a received signal affected by phase noise, inter-carrier interference (ICI) is generated, and an amplitude of the received signal is affected. For signal estimation, because a pilot is also affected by the phase noise, accuracy of the signal estimation is affected. In addition, when a frequency generated by a local oscillator is used for a sampling clock of an analog-to-digital converter (ADC), the phase noise also affects sampling of a digital signal.

For higher order modulation, such as 256 QAM or 1024 QAM, ICI brought by phase noise causes severe performance deterioration. A distributed PTRS is applicable to correction of a common phase error (CPE) of the phase noise, but does not facilitate ICI cancellation. A requirement on system performance may not be met by only using the distributed PTRS without increasing receiver complexity.

It may be learned that, for the distributed PTRS, impact, of inter-carrier interference caused by phase offset, on performance of a high-frequency communications system is almost not considered. When a modulation order is relatively high, the inter-carrier interference of the high-frequency (above 6 GHz) communications system cannot be accurately estimated, and a bit error rate is high, resulting in relatively low spectral efficiency.

A reference signal transmission method in an embodiment includes: generating, by a transmit end, one or more OFDM symbols, where at least one OFDM symbol includes a PTRS resource block, the PTRS resource block includes at least two of three sequences: a PTRS sequence of Y elements, X elements after the PTRS sequence, and Z elements before the PTRS sequence, and the PTRS resource block occupies a plurality of consecutive resource elements (RE); and sending the one or more OFDM symbols.

Correspondingly, a receive end receives the one or more OFDM symbols, and obtains a complete PTRS sequence from the one or more OFDM symbols.

The foregoing method may be performed by a network device, or may be performed by a terminal device. For example, if the transmit end is a network device, the receive end is a terminal device. Alternatively, if the transmit end is a terminal device, the receive end is a network device.

In the foregoing solution, each element in each sequence occupies one RE.

In the foregoing solution, each sequence is consecutive in each OFDM symbol, and is arranged in a frequency division manner, where X, Y, and Z are all integers, $1 \leq X \leq Y$, and $1 \leq Z \leq Y$.

The PTRS sequence occupying the Y elements is an initial PTRS sequence, is also a complete PTRS sequence, and may be a Zadoff-Chu (ZC) sequence or another sequence, where $Y \geq 1$.

In the foregoing solution, the PTRS resource block may be located in one or more RBs.

In the foregoing solution, each OFDM symbol may include the PTRS resource block, and the PTRS resource block may occupy a same frequency domain position or different frequency domain positions in the OFDM symbols.

Each OFDM symbol may include one or more PTRS resource blocks.

The following describes a structure of the PTRS resource block by using examples, and Y=5 is used as an example for description, that is, a length of the initial PTRS sequence is 5.

Figure 2A:
FIG. 2a is a schematic structural diagram of a PTRS resource block according to an embodiment of this application.

If the PTRS resource block includes the foregoing three sequences, for example, when X=2, Y=5, and Z=2, a complete sequence corresponding to the PTRS resource block is shown in FIG. 2a and includes three parts. P1 to P5 in a middle part are the initial PTRS sequence, P4 and P5 in a left part are a cyclic prefix, and P1 and P2 in a right part are a cyclic suffix. The three parts form a block-shaped cyclic PTRS (cyclic PTRS); and the three sequences are consecutively arranged, and are arranged in each OFDM symbol in a frequency division manner.

Figure 2B:
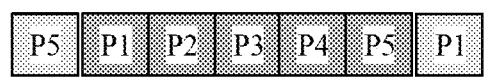
FIG. 2b is a schematic structural diagram of another PTRS resource block according to an embodiment of this application.

In the foregoing example, the initial PTRS sequence may have another value, the cyclic prefix and the cyclic suffix may also have other values, and the values of the cyclic prefix and the cyclic suffix may be the same or different. For example, when the values of the cyclic prefix and the cyclic suffix are 1, a complete sequence corresponding to the PTRS resource block is shown in FIG. 2b.

Figure 3A:
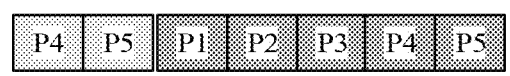
FIG. 3a is a schematic structural diagram of still another PTRS resource block according to an embodiment of this application.
Figure 3B:
FIG. 3b is a schematic structural diagram of still another PTRS resource block according to an embodiment of this application.

If the PTRS resource block includes the foregoing two sequences, one sequence is a complete PTRS sequence, and the other sequence is a partial PTRS sequence, for example, when X=2 and Y=5, as shown in FIG. 3a, P5 to P4 in a middle part still form a complete PTRS sequence, P4 in a left part is a cyclic prefix, and P5 in a right part is a cyclic suffix. For another example, when Z=2 and Y=S, as shown in FIG. 3b, P2 to P1 in a middle part still form a complete PTRS sequence, P1 in a left part is a cyclic prefix, and P2 in a right part is a cyclic suffix. The two sequences are consecutively arranged, and are arranged in each OFDM symbol in a frequency division manner.

For another example, when X=4 and Y=S, the PTRS resource block is shown in FIG. 3c. In this case, P3 to P2 in a middle part form a complete PTRS sequence, P2 in a left part is a cyclic prefix, and P3 to P5 in a right part form a cyclic suffix; or P4 to P3 in a middle part form a complete PTRS sequence, P2 and P3 in a left part are a cyclic prefix, and P4 and P5 in a right part form a cyclic suffix. Certainly, the cyclic prefix and the cyclic suffix may alternatively have other values, provided that the middle part forms a complete PTRS sequence. In addition, when Z=4 and Y=5, the case is similar to the foregoing case, refer to FIG. 3d, and details are not described again.

In the foregoing examples, the complete initial PTRS sequence may have another value, the cyclic prefix and the cyclic suffix may also have other values, and the values of the cyclic prefix and the cyclic suffix may be the same or different.

If the PTRS resource block includes two complete initial PTRS sequences, for example, when X=Y=5, or Z=Y=5, or X=Z=5, as shown in FIG. 4a, it is equivalent that two complete and consecutive PTRS sequences form the PTRS resource block, and the two parts form a block-shaped repeated PTRS (repeated PTRS). P3 to P2 in a middle part form a complete PTRS sequence, P1 and P2 in a left part are a cyclic prefix, and P3 to P5 in a right part form a cyclic suffix; or P4 to P3 in a middle part form a complete PTRS sequence, P1 to P3 in a left part are a cyclic prefix, and P4 and P5 in a right part form a cyclic suffix. Certainly, the cyclic prefix and the cyclic prefix may alternatively have other values, provided that the middle part forms a complete PTRS sequence.

If the PTRS resource block includes two incomplete initial PTRS sequences, for example, when the length Y of the initial PTRS sequence is 5, and the PTRS resource block includes only sequences of X=4 and Z=4, as shown in FIG. 4b, P3 to P2 in a middle part can still form a complete PTRS sequence, P2 in a left part is a cyclic prefix, and P3 and P4 in a right part form a cyclic suffix; or P4 to P3 in a middle part form a complete PTRS sequence, P2 and P3 in a left part are a cyclic prefix, and P4 in a right part forms a cyclic suffix. In this example, it is only required that the middle part forms a completed PTRS sequence, and a cyclic prefix and a cyclic suffix exist on the left side and the right side. In this case, first, $(X+Z) \geq Y$, to ensure that X elements and Z elements form a complete PTRS sequence; further, $(X+Z) \geq (Y+2)$, to ensure that a cyclic prefix and a cyclic suffix exist on two sides of the PTRS sequence.

In the foregoing examples, the initial PTRS sequence may have another value, the cyclic prefix and the cyclic suffix may also have other values, and the values of the cyclic prefix and the cyclic suffix may be the same or different.

It can be learned from the foregoing embodiments that the PTRS resource block in the OFDM symbol is a block-shaped cyclic PTRS or a block-shaped repeated PTRS, the middle part of the PTRS resource block needs to form a complete PTRS sequence, and remaining parts on two sides are respectively a cyclic prefix and a cyclic suffix. It is only required that the conditions are met.

In addition, in some cases, the PTRS resource block may alternatively include only a cyclic prefix or a cyclic suffix. For example, as shown in FIG. 3a and FIG. 3b, if P1 to P5 are used as a complete PTRS sequence, only a cyclic prefix or a cyclic suffix is included.

The following uses examples to describe a process of generating an OFDM symbol including the foregoing PTRS resource block.

When the PTRS resource block is a block-shaped cyclic PTRS, the method includes: generating an initial PTRS sequence, and introducing a cyclic prefix and a cyclic suffix to the sequence, to form a PTRS resource block, namely, a block-shaped cyclic PTRS; mapping the block-shaped cyclic PTRS to contiguous subcarriers in one or more RBs, where in one embodiment, a data symbol is mapped to another subcarrier; and then performing OFDM modulation, to obtain a to-be-sent OFDM symbol.

A length of the initial PTRS sequence is usually greater than 1, and there may be one or more OFDM symbols. The following uses four OFDM symbols and an initial PTRS sequence having a length of 5 as an example for description. The initial PTRS sequence may be a Zadoff-Chu (ZC) sequence or another sequence. This is not limited in this embodiment. The process of generating the OFDM symbol includes the following operations.

501. Generate a ZC sequence having a length of 5 as the initial PTRS sequence.

For example, a generation manner of the initial PTRS sequence is: $P_k = e^{-j\pi(k(k+1)/5)}$, where k=1, 2, 3, 4, and 5, and elements of the generated initial PTRS sequence are respectively {P1, P2, P3, P4, P5}.

The foregoing generation manner is only an example, and the initial PTRS sequence may be generated in another manner. This is not limited in this embodiment.

502. Introduce a cyclic prefix and a cyclic suffix to the initial PTRS sequence, to obtain a block-shaped cyclic PTRS.

For example, the last two elements P4 and P5 of the initial PTRS sequence {P1, P2, P3, P4, P5} are replicated to a head of the sequence, and the first two elements P1 and P2 of the sequence are replicated to a tail of the sequence, to obtain a block-shaped cyclic PTRS having a length of 9, as shown in FIG. 2a.

Alternatively, the last element P5 of the sequence may be replicated to a head of the sequence, and the first element P1 of the sequence may be replicated to a tail of the sequence, to obtain a block-shaped cyclic PTRS having a length of 7, as shown in FIG. 2b.

Alternatively, the last three elements P3 to P5 of the sequence may be replicated to a head of the sequence, and the first three elements P1 to P3 of the sequence may be replicated to a tail of the sequence, to obtain a block-shaped cyclic PTRS having a length of 11.

Alternatively, the last four elements P2 to P5 of the sequence may be replicated to a head of the sequence, and the first four elements P1 to P4 of the sequence may be replicated to a tail of the sequence, to obtain a block-shaped cyclic PTRS having a length of 13.

The method may be performed by a network device, or may be performed by a terminal device. If the method is performed by a network device, the length of the initial PTRS sequence and lengths of the cyclic prefix and the cyclic suffix may be determined or predefined by the network device. If the method is performed by a terminal device, the length of the initial PTRS sequence and lengths of the cyclic prefix and the cyclic suffix may be determined by a network device and then notified to the terminal device. For example, the length of the initial PTRS sequence and the lengths of the cyclic prefix and the cyclic suffix are configured or predefined by using RRC (radio resource control) signaling or DCI (downlink control information). The lengths of the prefix and the suffix may be the same or may be different. This is not limited in this embodiment.

503. Map the block-shaped cyclic PTRS to contiguous subcarriers that are scheduled.

A block-shaped cyclic PTRS having a length of 9 is used as an example. The block-shaped cyclic PTRS is mapped to consecutive REs of each OFDM symbol. Using four OFDM symbols as an example, the block-shaped cyclic PTRS having a length of 9 is mapped to nine consecutive REs of one RB (resource block) in scheduled bandwidth, and each element occupies one RE. Herein, it is assumed that positions to which the PTRS is mapped in the four OFDM symbols are completely the same. A position of the mapped PTRS is shown in FIG. 5.

In FIG. 5, the block-shaped cyclic PTRS is mapped to each OFDM symbol. In another example, the block-shaped cyclic PTRS may alternatively be mapped to only some OFDM symbols. For example, the block-shaped cyclic PTRS is mapped to only the first OFDM symbol and the third OFDM symbol.

Certainly, positions to which the PTRS is mapped in the OFDM symbols may alternatively be different or partially the same, or the block-shaped cyclic PTRS may be mapped to different RBs. In addition, the block-shaped cyclic PTRS may alternatively be mapped to a same OFDM symbol for a plurality of times.

504. Map a data symbol to an RE corresponding to a remaining subcarrier, where the data symbol is represented by D.

505. Perform OFDM modulation on mapped symbols, and send an OFDM symbol obtained through the modulation.

When the PTRS resource block is a block-shaped repeated PTRS, the method includes: generating an initial PTRS sequence, and repeating the sequence, to form a PTRS resource block, namely, a block-shaped repeated PTRS; mapping the block-shaped repeated PTRS to contiguous subcarriers in one or more RBs, wherein one embodiment, a data symbol is mapped to another subcarrier; and performing OFDM modulation, to obtain a to-be-sent OFDM symbol.

A length of the initial PTRS sequence is usually greater than 1, and there may be one or more OFDM symbols. The following uses four OFDM symbols and an initial PTRS sequence having a length of 5 as an example for description. The initial PTRS sequence may be a Zadoff-Chu (ZC) sequence or another sequence. This is not limited in this embodiment. The process of generating the OFDM symbol includes the following operations.

601. Generate a ZC sequence having a length of 5 as the initial PTRS sequence.

The generated initial PTRS sequence is {P1, P2, P3, P4, P5}. A generation process is the same as that in 501, and details are not described again.

602. Repeat the PTRS sequence for one time, and perform sequential arrangement to obtain a block-shaped repeated PTRS having a length of 10.

The block-shaped repeated PTRS is: {P1, P2, P3, P4, P5, P1, P2, P3, P4, P5}.

603. Map the block-shaped repeated PTRS to contiguous subcarriers that are scheduled.

A mapping manner is similar to that in operation 503. The block-shaped repeated PTRS is mapped to ten consecutive REs of one RB in scheduled bandwidth, and each element occupies one RE. Herein, it is assumed that positions to which the PTRS is mapped in the four OFDM symbols are completely the same. A position of the mapped PTRS is shown in FIG. 6.

In FIG. 6, the block-shaped repeated PTRS is mapped to each OFDM symbol. In another example, the block-shaped repeated PTRS may alternatively be mapped to only some OFDM symbols. For example, the block-shaped repeated PTRS is mapped to only the first OFDM symbol and the third OFDM symbol.

Certainly, positions to which the PTRS is mapped in the OFDM symbols may alternatively be different or partially the same, or the block-shaped repeated PTRS may be mapped to different RBs. In addition, the block-shaped repeated PTRS may alternatively be mapped to a same OFDM symbol for a plurality of times.

Operations 604 and 605 are the same as operations 504 and 505, and details are not described again.

The following briefly describes a receiving process of an OFDM symbol.

One or more OFDM symbols are received, a position of a PTRS resource block is determined based on RE positions to which the PTRS is mapped, and a complete PTRS sequence is obtained from the PTRS resource block. Further, phase noise estimation and compensation may be performed by using the PTRS sequence.

The receiving process may be performed by a network device, or may be performed by a terminal device. For example, after a position of a PTRS resource block having a length of N is determined, a complete PTRS sequence that has a length of Y and that is consecutive in frequency domain is captured by starting from a $K^{th}$ RE of the PTRS resource block, where a possible value of K is 1, 2, . . . , or N−Y+1. The value of K may be determined or predefined by the network device, or may be notified by the network device to the terminal device.

In the foregoing method, in the PTRS resource block, interference of data to the PTRS is isolated by using the cyclic prefix and the cyclic suffix or by repeating elements on two sides of the PTRS, to estimate and compensate for a CPE of phase noise and ICI.

Figure 7:
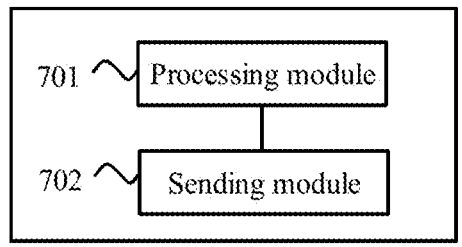
FIG. 7 is a schematic diagram of modules of a transmit end device according to an embodiment of the present application.

Corresponding to the foregoing method embodiment, a corresponding reference signal transmission apparatus is further disclosed. Referring to FIG. 7, a transmit end includes:

a processing module 701, configured to generate one or more orthogonal frequency division multiplexing (OFDM) symbols, where at least one OFDM symbol includes a phase tracking reference signal (PTRS) resource block, the PTRS resource block includes at least two of three sequences: a PTRS sequence of Y elements, X elements after the PTRS sequence, and Z elements before the PTRS sequence, and the PTRS resource block occupies a plurality of consecutive resource elements (REs), where X, Y, and Z are all integers; and a sending module 702, configured to send the one or more OFDM symbols.

In the foregoing solution, each OFDM symbol may include the PTRS resource block, and there may be one or more PTRS resource blocks in one OFDM symbol. In this case, the foregoing solution may be:

a processing module 701, configured to generate one or more orthogonal frequency division multiplexing (OFDM) symbols, where each OFDM symbol includes at least one phase tracking reference signal (PTRS) resource block, each PTRS resource block includes at least two of three sequences: a PTRS sequence of Y elements, X elements after the PTRS sequence, and Z elements before the PTRS sequence, and the PTRS resource block occupies a plurality of consecutive resource elements (REs), where X, Y, and Z are all integers; and a sending module 702, configured to send the one or more OFDM symbols.

Figure 8:
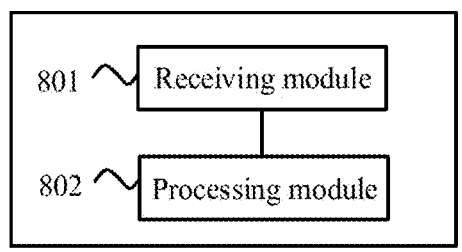
FIG. 8 is a schematic diagram of modules of a receive end device according to an embodiment of the present application.

Referring to FIG. 8, a receive end includes:

a receiving module 801, configured to receive one or more orthogonal frequency division multiplexing (OFDM) symbols, where at least one OFDM symbol includes a phase tracking reference signal (PTRS) resource block, the PTRS resource block includes at least two of three sequences: a PTRS sequence of Y elements, X elements after the PTRS sequence, and Z elements before the PTRS sequence, and the PTRS resource block occupies a plurality of consecutive resource elements (REs), where X, Y, and Z are all integers; and a processing module 802 configured to obtain a complete PTRS sequence from the one or more OFDM symbols.

In the foregoing solution, each OFDM symbol may include the PTRS resource block, and there may be one or more PTRS resource blocks in one OFDM symbol. In this case, the foregoing solution may be:

a receiving module 801, configured to receive one or more orthogonal frequency division multiplexing (OFDM) symbols, where each OFDM symbol includes at least one phase tracking reference signal (PTRS) resource block, each PTRS resource block includes at least two of three sequences: a PTRS sequence of Y elements, X elements after the PTRS sequence, and Z elements before the PTRS sequence, and the PTRS resource block occupies a plurality of consecutive resource elements (REs), where X, Y, and Z are all integers; and a processing module 802, configured to obtain a complete PTRS sequence from the one or more OFDM symbols.

If the transmit end is a network device, the receive end is a terminal device. Alternatively, if the transmit end is a terminal device, the receive end is a network device.

The apparatus may alternatively be a chip.

For the foregoing apparatus, the transmit end or the receive end is divided into function modules based on the method embodiment, and a corresponding module performs a corresponding operation in the method embodiment. For details, refer to the method embodiment. Details are not described again. The foregoing module may be implemented in a form of hardware, or may be implemented in a form of a software function module. It should be noted that, in this embodiment of this application, module division is an example, and is merely logical function division. In an actual implementation, another division manner may be used.

There is further an embodiment of another form for the network device and the terminal device in the foregoing embodiments. The processing module may be replaced with a processor, the sending module may be replaced with a transmitter, and the receiving module may be replaced with a receiver, to respectively perform the sending operation, the receiving operation, and the related processing operation in the foregoing method embodiment. The transmit end includes:

a processor, configured to generate one or more orthogonal frequency division multiplexing (OFDM) symbols, where at least one OFDM symbol includes a phase tracking reference signal (PTRS) resource block, the PTRS resource block includes at least two of three sequences: a PTRS sequence of Y elements, X elements after the PTRS sequence, and Z elements before the PTRS sequence, and the PTRS resource block occupies a plurality of consecutive resource elements (REs), where X, Y, and Z are all integers; and a transmitter, configured to send the one or more OFDM symbols.

The receive end includes:

a receiver, configured to receive one or more orthogonal frequency division multiplexing (OFDM) symbols, where at least one OFDM symbol includes a phase tracking reference signal (PTRS) resource block, the PTRS resource block includes at least two of three sequences: a PTRS sequence of Y elements, X elements after the PTRS sequence, and Z elements before the PTRS sequence, and the PTRS resource block occupies a plurality of consecutive resource elements (REs), where X, Y, and Z are all integers; and a processor, configured to obtain a complete PTRS sequence from the one or more OFDM symbols.

Figure 9:
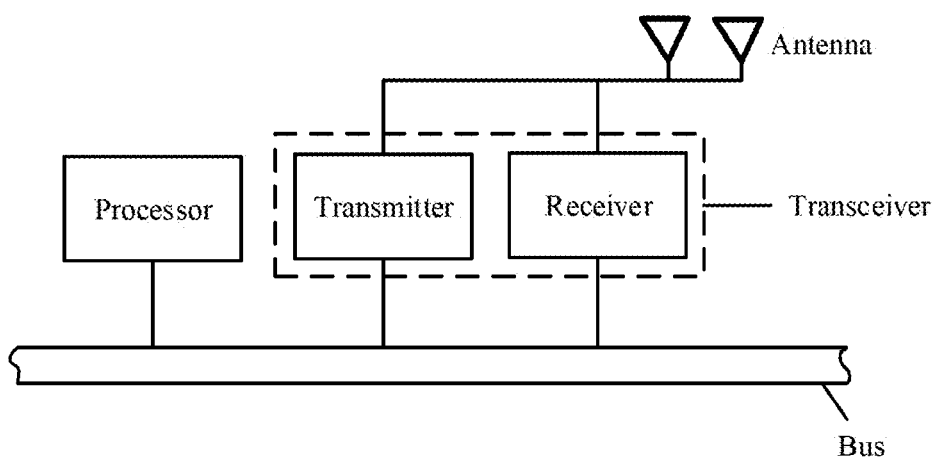
FIG. 9 is a schematic architectural diagram of hardware of another transmit end device/receive end device according to an embodiment of the present application.

For a structure of the foregoing apparatus embodiment of another form, refer to FIG. 9. The processor may a general-purpose processor, a digital signal processor, an application-specific integrated circuit, a field programmable gate array, or another programmable logic device.

The receiver is configured to receive data and/or a signal, and the transmitter is configured to send data and/or a signal. The transmitter and the receiver may be independent components, or may be an integral component, such as a transceiver. Therefore, the transmitter or the receiver in the foregoing embodiment may be replaced with a transceiver.

An antenna may further be included, and there may be one or more antennas.

The foregoing components may be coupled together through a bus. In addition to a data bus, the bus further includes a power bus, a control bus, and a status signal bus. However, for clear description, various types of buses in the figure are marked as the bus.

Further, in an embodiment, a memory (not shown in the figure) may further be included, and is configured to store computer-executable program code. When the program code includes an instruction, and the processor executes the instruction, the instruction enables the network device or the terminal device to perform a corresponding operation in the method embodiment. In addition, the memory may alternatively be located in the processor.

This application further provides a computer program product. When the computer program product is run on a computer, the computer is enabled to perform any method provided above. This application further provides a communications chip. The communications chip stores an instruction, and when the instruction is run on a network device or a terminal device, the network device or the terminal device is enabled to perform the method provided above.

The memory includes, but is not limited to, a random access memory (RAM), a read-only memory (ROM), an erasable programmable read-only memory (EPROM), or a compact disc read-only memory (CD-ROM). The memory is configured to store a related instruction and related data.

The memory is configured to store program code and data of a transmit end device, and may be a separate component or integrated into the processor.

The foregoing components may be integrated into a chip for implementation, for example, integrated into a baseband chip for implementation.

According to the reference signal transmission method and apparatus in the foregoing embodiments, because the cyclic prefix and the cyclic suffix are set on two sides of the PTRS sequence, inter-carrier interference is reduced, and in particular, when a modulation order is relatively high, a bit error rate is reduced, thereby improving spectral efficiency.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or other programmable apparatuses. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a digital versatile disc (DVD)), a semiconductor medium (for example, a solid-state drive (SSD)), or the like.

A person of ordinary skill in the art may understand that all or some of the processes of the methods in the embodiments may be implemented by a computer program instructing relevant hardware. The program may be stored in a computer-readable storage medium. When the program is run, the processes of the methods in the embodiments may be performed. The foregoing storage medium includes: any medium that can store program code, such as a read-only memory (ROM), a random access memory (RAM), a magnetic disk, or an optical disc.

The invention claimed is:

1. A reference signal communication method comprising:
generating one or more orthogonal frequency division multiplexing (OFDM) symbols, wherein at least one OFDM symbol comprises a phase tracking reference signal (PTRS) resource block, the PTRS resource block comprising at least two of: a PTRS sequence comprising Y elements, last X elements in the PTRS sequence, and first Z elements in the PTRS sequence, and the PTRS resource block occupies a plurality of consecutive resource elements (REs), wherein each element occupies one RE, wherein X, Y, and Z are integers; and
sending the one or more OFDM symbols.

2. The method according to claim 1, wherein the PTRS resource block is located in one or more resource blocks (RBs).

3. The method according to claim 1, wherein:
the PTRS resource block comprises X+Y+Z elements, and the X elements, the Y elements, and the Z elements are consecutive and arranged in a frequency division manner; or
the PTRS resource block comprises X+Y elements or Y+Z elements, and the X elements and the Y elements, or the Y elements and the Z elements are consecutive and arranged in a frequency division manner; or
the PTRS resource block comprises X+Z elements, and the X elements and the Z elements are consecutive and arranged in a frequency division manner;
wherein X≤Y, Z≤Y.

4. The method according to claim 1, wherein the PTRS resource block occupies a same position in each OFDM symbol.

5. A reference signal communication method comprising:
receiving one or more orthogonal frequency division multiplexing (OFDM) symbols, wherein at least one OFDM symbol comprises a phase tracking reference signal (PTRS) resource block, the PTRS resource block comprising at least two of: a PTRS sequence comprising Y elements, last X elements in the PTRS sequence, and first Z elements in the PTRS sequence, and the PTRS resource block occupies a plurality of consecutive resource elements (REs), wherein each element occupies one RE, wherein X, Y, and Z are integers; and
obtaining a complete PTRS sequence from the one or more OFDM symbols.

6. The method according to claim 5, wherein the PTRS resource block is located in one or more resource blocks (RBs).

7. The method according to claim 5, wherein:
the PTRS resource block comprises X+Y+Z elements, and the X elements, the Y elements, and the Z elements are consecutive and arranged in a frequency division manner; or
the PTRS resource block comprises X+Y elements or Y+Z elements, and the X elements and the Y elements, or the Y elements and the Z elements are consecutive and arranged in a frequency division manner; or
the PTRS resource block comprises X+Z elements, and the X elements and the Z elements are consecutive and arranged in a frequency division manner;
wherein X≤Y, Z≤Y.

8. The method according to claim 5, wherein the PTRS resource block occupies a same position in each OFDM symbol.

9. A communication apparatus comprising:
a processor configured to generate one or more orthogonal frequency division multiplexing (OFDM) symbols, wherein at least one OFDM symbol comprises a phase tracking reference signal (PTRS) resource block, the PTRS resource block comprising at least two of: a PTRS sequence comprising Y elements, last X elements in the PTRS sequence, and first Z elements in the PTRS sequence, and the PTRS resource block occupies a plurality of consecutive resource elements (REs), wherein each element occupies one RE, wherein X, Y, and Z are integers; and
a transmitter configured to send the one or more OFDM symbols.

10. The apparatus according to claim 9, wherein the PTRS resource block is located in one or more resource blocks (RBs).

11. The apparatus according to claim 9 wherein:
the PTRS resource block comprises X+Y+Z elements, and the X elements, the Y elements, and the Z elements are consecutive and arranged in a frequency division manner; or
the PTRS resource block comprises X+Y elements or Y+Z elements, and the X elements and the Y elements, or the Y elements and the Z elements are consecutive and arranged in a frequency division manner; or
the PTRS resource block comprises X+Z elements, and the X elements and the Z elements are consecutive and arranged in a frequency division manner;
wherein X≤Y, Z≤Y.

12. The apparatus according to claim 9, wherein the PTRS resource block occupies a same position in each OFDM symbol.

13. A communication apparatus comprising:
a receiver configured to receive one or more orthogonal frequency division multiplexing (OFDM) symbols, wherein at least one OFDM symbol comprises a phase tracking reference signal (PTRS) resource block, the PTRS resource block comprising at least two of: a PTRS sequence comprising Y elements, last X elements in the PTRS sequence, and first Z elements in the PTRS sequence, and the PTRS resource block occupies a plurality of consecutive resource elements (REs), wherein each element occupies one RE, wherein X, Y, and Z are integers; and
a processor configured to obtain a complete PTRS sequence from the one or more OFDM symbols.

14. The apparatus according to claim 13, wherein the PTRS resource block is located in one or more resource blocks (RBs).

15. The apparatus according to claim 13, wherein:
the PTRS resource block comprises X+Y+Z elements, and the X elements, the Y elements, and the Z elements are consecutive and arranged in a frequency division manner; or
the PTRS resource block comprises X+Y elements or Y+Z elements, and the X elements and the Y elements, or the Y elements and the Z elements are consecutive and arranged in a frequency division manner; or
the PTRS resource block comprises X+Z elements, and the X elements and the Z elements are consecutive and arranged in a frequency division manner;
wherein X≤Y, Z≤Y.

16. The apparatus according to claim 13, wherein the PTRS resource block occupies a same position in each OFDM symbol.

* * * * *